US009506522B2

(12) United States Patent
Komiya et al.

(10) Patent No.: US 9,506,522 B2
(45) Date of Patent: Nov. 29, 2016

(54) FLUID-FILLED VIBRATION DAMPING DEVICE

(71) Applicant: SUMITOMO RIKO COMPANY LIMITED, Komaki-shi, Aichi (JP)

(72) Inventors: Yasuhiro Komiya, Kasugai (JP); Akihito Tanahashi, Niwa-gun (JP); Kei Okumura, Kakamigahara (JP)

(73) Assignee: SUMITOMO RIKO COMPANY LIMITED, Aichi (JP)

( * ) Notice: Subject to any disclaimer, the term of this patent is extended or adjusted under 35 U.S.C. 154(b) by 0 days.

(21) Appl. No.: 14/831,107

(22) Filed: Aug. 20, 2015

(65) Prior Publication Data

US 2016/0195154 A1  Jul. 7, 2016

(30) Foreign Application Priority Data

Jan. 7, 2015  (JP) .................. 2015-001857

(51) Int. Cl.
  *F16F 9/34*  (2006.01)
  *F16F 13/10* (2006.01)
  *F16F 13/08* (2006.01)
  *B60K 5/12*  (2006.01)
(52) U.S. Cl.
  CPC ............. *F16F 13/10* (2013.01); *B60K 5/1208* (2013.01); *F16F 13/08* (2013.01)
(58) Field of Classification Search
  CPC .......... F16F 13/10; F16F 13/22; F16F 13/26; F16F 13/106
  USPC ............. 267/140.1–140.5, 141.1–141.7, 219
  See application file for complete search history.

(56) References Cited

U.S. PATENT DOCUMENTS

| 4,711,206 | A | * | 12/1987 | Andra | F16F 13/22 248/636 |
| 4,796,876 | A | * | 1/1989 | Sciortino | F16F 13/22 267/140.13 |
| 5,269,498 | A | * | 12/1993 | Bretaudeau | F16F 13/10 267/140.13 |
| 5,443,245 | A | * | 8/1995 | Bellamy | F16F 13/106 267/140.13 |
| 7,216,857 | B2 | | 5/2007 | Yamamoto | |

(Continued)

FOREIGN PATENT DOCUMENTS

JP  2005-351350 A  12/2005
JP     4861843 B2   1/2012

OTHER PUBLICATIONS

U.S. Appl. No. 14/994,722, filed Jan. 13, 2016 in the name of Takashi Hayashi.

*Primary Examiner* — Christopher Schwartz
(74) *Attorney, Agent, or Firm* — Oliff PLC (57) ABSTRACT

A fluid-filled vibration device including a pressure receiving chamber and an equilibrium chamber communicated by an orifice passage and a connecting hole provided on a partition member partitioning the two chambers. The connecting hole is closed by a closing rubber elastic plate to which pressures of the two chambers are applied from the respective sides. The closing rubber elastic plate includes at its outer circumference edge part abutting retaining parts held by the partition member, an elastic deformation area which is provided circumferentially between the abutting retaining parts and elastically deformed to open the connecting hole, and a mass part provided at a circumference direction intermediate part of the elastic deformation area to constitute a mass-spring system together. The resonance frequency of the system is tuned to 50 Hz or greater and set higher than a tuning frequency of the orifice passage.

7 Claims, 6 Drawing Sheets

(56) References Cited

U.S. PATENT DOCUMENTS

| | | |
|---|---|---|
| 7,780,154 B2 | 8/2010 | Katagiri et al. |
| 8,556,239 B2 * | 10/2013 | Okumura .............. F16F 13/106 267/140.13 |
| 2008/0023897 A1 * | 1/2008 | Muraoka ................. F16F 13/26 267/140.11 |
| 2009/0140477 A1 * | 6/2009 | Michiyama ........... F16F 13/106 267/121 |

\* cited by examiner

FLUID-FILLED VIBRATION DAMPING DEVICE

INCORPORATED BY REFERENCE

The disclosure of Japanese Patent Application No. 2015-001857 filed on Jan. 7, 2015 including the specification, drawings and abstract is incorporated herein by reference in its entirety.

BACKGROUND OF THE INVENTION

1. Field of the Invention

The present invention relates to a fluid-filled vibration damping device that uses a vibration damping effect based on the flow action of non-compressible fluid filled inside.

2. Description of the Related Art

As one type of vibration damping device, such as a vibration damping connecting body, a vibration damping support body or the like, interposed between members constituting a vibration transmission system, there is a vibration damping device including a first mounting member, a second mounting member, and a main rubber elastic body elastically connecting the first mounting member and the second mounting member. A fluid-filled vibration damping device has been known as an evolved model of the vibration damping device. This fluid-filled vibration damping device includes a pressure receiving chamber whose wall is partially constituted by the main rubber elastic body and an equilibrium chamber whose wall is partially constituted by a flexible film. Non-compressible fluid is sealed in both chambers, and both chambers are in communication with each other through an orifice path. This kind of constitution makes it possible to exhibit a vibration damping effect owing to flow action, e.g., the resonance action of fluid that flows through an orifice path due to the difference in pressure between the pressure receiving chamber and the equilibrium chamber upon input of the vibration to the pressure receiving chamber. The fluid-filled vibration damping has been applied, for example as an automobile engine mount, a body mount, a differential mount, a suspension member mount, a suspension bush or the like.

The engine mount of an automobile or the like is requested to exhibit respective vibration damping effect for a plurality of frequency ranges. To meet this end, the orifice passage is tuned to a low frequency large amplitude vibration, such as an engine shake or the like, and a movable membrane is further provided for absorbing the pressure fluctuation of the pressure receiving chamber at a high frequency small amplitude vibration such as booming noise or the like.

In addition, with automobile engine mounts and the like, a problem of vibration and noise occurring during input of excessive vibration load or impact load have been overrated. This is thought to mainly be caused by cavitation bubbles that accompany the generation of an excessive negative pressure in the pressure receiving chamber. Specifically, when the pressure receiving chamber to which a large amplitude vibration has been input goes to an excessively negative pressure state, the air dissolved in the fluid of the pressure receiving chamber undergoes liquid phase separation, and cavitation bubbles are formed. Then, it is thought that the water hammer pressure that accompanies the collapse of the bubbles is spread to the first mounting member and second mounting member, and by being transmitted to members constituting a vibration transmission system such as of an automobile body or the like, problematic noise and vibration are generated.

To deal with this problem, the present applicant proposed previously in U.S. Pat. No. 8,556,239 a novel structure for which a connecting hole is provided in a partition member for partitioning the pressure receiving chamber and the equilibrium chamber in order to have both chambers communicate, and a closing rubber elastic plate for closing the connecting hole is overlapped from the pressure receiving chamber side on the connecting hole to constitute a connecting hole communication and blocking control means. When a rapid pressure decrease occurs in the pressure receiving chamber upon input of an excessive vibration load or impact load, the connecting hole goes to a communication state by the closing rubber elastic plate being elastically deformed and separating from the partition member, and the pressure receiving chamber and the equilibrium chamber become short circuited, and thus negative pressure being generated in the pressure receiving chamber is avoided. Also, this closing rubber elastic plate, by exhibiting an absorption function of the pressure fluctuation of the pressure receiving chamber by being elastically deformed in a blocked state, exhibits a vibration damping effect on high frequency, small amplitude vibration.

The present inventors made further investigation of the fluid-filled vibration damping device of U.S. Pat. No. 8,556,239 and came to believe that there is still room for improvement. Specifically, with the communication and blocking control means noted in U.S. Pat. No. 8,556,239, an elastic deformation area of the closing rubber elastic plate for which the connection hole is opened by elastic deformation is provided between both circumference ends of an abutting retaining part, making it difficult for the elastic deformation area to separate from the opening of the connecting hole, during input of normal vibrations such as an engine shake, a driving rumble or the like. Because of that, the vibration insulating action on the input of high frequency small amplitude vibration is exhibited by the fluid pressure absorption function through elastic deformation of the closing rubber elastic plate covering the connecting hole. This may possibly cause a certain amount of limitation of the vibration insulating action due to the deformation rigidity of the closing rubber elastic plate.

To advantageously obtain the vibration insulating action, it is conceivable to make the deformation rigidity of the closing rubber elastic plate markedly smaller. However, this is likely to cause more readily elastic deformation of the closing rubber elastic plate based on the pressure difference applied to both the front and back surfaces of the closing rubber elastic plate, during input of vibration such as the engine shake or the like. As a result, the relative pressure difference between the pressure receiving chamber and the equilibrium chamber becomes smaller, the flow action volume of fluid passing through the orifice passage decreases, leading to difficulty in sufficiently exhibiting the vibration damping effect by the orifice passage against the low frequency large amplitude vibration.

SUMMARY OF THE INVENTION

It is therefore one object of this invention to provide a fluid-filled vibration damping device of an improved structure capable of exhibiting more effectively: (i) a vibration damping effect by the orifice passage on the low frequency vibration, (ii) the impact and noise inhibiting effect when excessive vibration is input, and (iii) an improved vibration damping effect on high frequency vibration.

Specifically, a first mode of the present invention provides a fluid-filled vibration damping device comprising: a first mounting member; a second mounting member; a main rubber elastic body elastically connecting the first mounting member and the second mounting member; a pressure receiving chamber whose wall is partially defined by the main rubber elastic body; an equilibrium chamber whose wall is partially defined by a flexible film; a partition member partitioning the pressure receiving chamber and the equilibrium chamber from each other; a non-compressible fluid sealed in the pressure receiving chamber and the equilibrium chamber; an orifice passage mutually connecting the pressure receiving chamber and the equilibrium chamber; at least one connecting hole provided through the partition member to communicate the pressure receiving chamber and the equilibrium chamber; and a closing rubber elastic plate being provided such that the closing rubber elastic plate is overlapped from a pressure receiving chamber side on the connecting hole to close the connecting hole, and the closing rubber elastic plate is opened based on elastic deformation, and a pressure of the pressure receiving chamber is applied to a first surface of the closing rubber elastic plate, while a pressure of the equilibrium chamber is applied through the connecting hole to a second surface, wherein the closing rubber elastic plate includes a plurality of abutting retaining parts at its outer circumference edge part, the abutting retaining parts are held in an overlapping state to the partition member, and are spaced away from one another in a circumference direction, wherein between adjacent abutting retaining parts in the circumference direction, the closing rubber elastic plate includes at least one elastic deformation area configured to be elastically deformed based on a pressure difference between the pressure receiving chamber and the equilibrium chamber to be separated from the partition member and to open the connecting hole, allowing fluid flow action between the pressure receiving chamber and the equilibrium chamber through the connecting hole, and wherein at least one mass part is provided at a circumference direction intermediate part of the elastic deformation area, the mass part and the elastic deformation area constitute at least one mass-spring system, a resonance frequency of the mass-spring system is tuned to 50 Hz or greater, and a tuning frequency of the orifice passage is set to a lower frequency than the resonance frequency of the mass-spring system.

With the fluid-filled vibration damping device constituted according to the first mode, upon input of vibration of the frequency to which the mass-spring system is tuned, a circumference direction intermediate part of the elastic deformation area for which a mass part is provided is actively displaced by the resonance of the mass-spring system and made to elastically deform, and the connecting hole is sufficiently opened. This will generate fluid flow action through the connecting hole between the pressure receiving chamber and the equilibrium chamber, thereby advantageously exhibiting vibration insulating action by lower dynamic spring.

In addition, with the closing rubber elastic plate arranged in the non-compressible fluid, since the resonance frequency of the mass-spring system is tuned to 50 Hz or greater, it is easy for the orifice passage to be tuned to a lower frequency than that. For vibration input of the frequency range to which the orifice passage is tuned, active opening of the connecting hole due to the resonance of the mass-spring system is avoided, thereby limiting communication through the connecting hole of the pressure receiving chamber and the equilibrium chamber. This makes it possible to obtain a sufficient volume of fluid flowing through the orifice passage, and to effectively obtain a vibration damping effect by the orifice passage. Therefore, while effectively obtaining a vibration damping effect based on the flow action of the fluid in the orifice passage, for the vibration input of the frequency range at which the orifice passage is essentially closed due to anti-resonance, it is possible to obtain an excellent vibration insulation effect using the flow action of fluid through the connecting hole that opens using the resonance of the mass-spring system.

The second mode of the present invention provides the fluid-filled vibration damping device according to the first mode, wherein a thick wall part is provided on the circumference direction intermediate part of the elastic deformation area, and the mass part is constituted by the thick wall part.

With the second mode, by using the thick wall part provided on the elastic deformation area, it is possible to easily form the mass part on the circumference direction intermediate part of the elastic deformation area, and the level of freedom for the mass of the mass part is greater, and adjustment of the resonance frequency of the mass-spring system is easier. Preferably, by providing the thick wall part projecting at the pressure receiving chamber side, for example by having the surface overlapping the opening part of the connecting hole be a flat surface, it is possible to have the thick wall part be a shape that makes it easy to close the connecting hole. Also, when the abutting retaining part is sandwiched in the thickness direction of the closing rubber elastic plate by the partition member, it is desirable that the thick wall part be thinner walled than the abutting retaining part so as to separate from the partition member in the thickness direction.

The third mode of the present invention provides the fluid-filled vibration damping device according to the first or second mode, wherein the mass part is integrally formed with the elastic deformation area.

With the third mode, it is not necessary to do afterforming of the mass part such as by adhering a separate member, making it possible to easily obtain the mass part. The mass part, in addition to being formed as an integrated unit with the elastic deformation area by being constituted by a thick wall part as shown in the second mode, for example, can also have a mass part with a larger specific gravity than the elastic deformation area be formed as an integrated unit by doing two color molding of the elastic deformation area and the mass part with roughly the same thickness using rubber or a resin elastomer or the like of differing specific gravities.

The fourth mode of the present invention provides the fluid-filled vibration damping device according to any one of the first through third modes, wherein the mass part is provided on an outer circumference end part of the closing rubber elastic plate.

With the fourth mode, the outer circumference end part of the closing rubber elastic plate that covers the connecting hole is elastically deformed by the displacement of the mass part, so opening and closing of the connecting hole is switched with excellent responsiveness in relation to the mass part displacement. Thus, the low dynamic spring effect by the mass-spring system resonance is more effectively exhibited.

The fifth mode of the present invention provides the fluid-filled vibration damping device according to any one of the first through fourth modes, wherein the at least one connecting hole comprises a plurality of connecting holes formed through the partition member, the at least one elastic deformation area comprises a plurality of the elastic deformation areas formed on the circumference of the closing rubber elastic plate, the at least one mass part comprises a plurality of mass parts, the at least one mass-spring system comprises a plurality of mass-spring systems, and the plurality of the mass-spring systems are constituted by providing the mass parts on the circumference direction intermediate parts of the plurality of elastic deformation areas, respectively.

With the fifth mode, by having the resonance frequency of the plurality of mass-spring systems be set roughly the same, the total opening surface area of the communication holes during resonance of those mass-spring systems is large. This makes it possible to more advantageously obtain the fluid flow action volume between the pressure receiving chamber and the equilibrium chamber through the connecting hole, and also to even more effectively obtain the vibration insulating action on the vibration input of specific frequencies.

Also, if the resonance frequencies of the plurality of mass-spring systems are set to be a plurality of mutually different frequencies, it is possible to obtain a vibration insulating action with a wide frequency range for which the plurality of connecting holes selectively open in relation to vibration input of a wide range of frequencies.

The sixth mode of the present invention provides the fluid-filled vibration damping device according to any one of the first through fifth modes, wherein the closing rubber elastic plate includes: a center attachment part integrally formed at its center part, the center attachment part being attached in a fixed state to the partition member; and spoke shaped retaining parts extending in radial form toward an outer circumference side from the center attachment part, and wherein the abutting retaining parts are provided so as to extend in the circumference direction from tip end parts of the spoke shaped retaining parts.

With the sixth mode, the closing rubber elastic plate is supported by the partition member at both the center part and the outer circumference part, so at the time of input of vibration of the frequency to which the orifice passage is tuned, the elastic deformation volume of the closing rubber elastic plate is limited. This makes it possible to prevent a reduction of the relative fluid pressure fluctuation of the pressure receiving chamber and the equilibrium chamber due to elastic deformation of the closing rubber elastic plate. Therefore, fluid flow action is efficiently generated through the orifice passage, and it is possible to effectively obtain the vibration damping effect based on the flow action of the fluid.

Furthermore, since the spoke shaped retaining parts that connect the center attachment part and the abutting retaining parts are formed so as to extend in radial form, the elastic deformation volume of the closing rubber elastic plate is even more limited. This makes it possible to even more effectively exhibit the vibration damping effect of the orifice passage on low frequency, large amplitude vibration input.

At the part surrounded by the center attachment part, the abutting retaining parts, and the spoke shaped retaining parts with the closing rubber elastic plate, a fluid pressure absorbing action is exhibited by the thickness direction elastic deformation on high frequency small amplitude vibration more than with the tuning frequency of the orifice passage. This makes it possible to exhibit a vibration insulation effect by lower dynamic spring.

The seventh mode of the present invention provides the fluid-filled vibration damping device according to any one of the first through sixth modes, wherein the tuning frequency of the orifice passage is set to 5 to 15 Hz.

With the seventh mode, the resonance frequency of the mass-spring system with the closing rubber elastic plate is set to a sufficiently high frequency in relation to the tuning frequency of the orifice passage. Because of that, the connecting hole is kept in a closed state in relation to input of vibration of the frequency to which the orifice passage is tuned, and a vibration damping effect by the orifice passage is effectively exhibited. On the other hand, a vibration damping effect by lower dynamic spring is exhibited by the opening of the connecting hole using the resonance of the mass-spring system in relation to input of vibration of a higher frequency than the tuning frequency of the orifice passage.

With the present invention, a mass-spring system is constituted by an elastic deformation area of a closing rubber elastic plate for switching between closing and opening the connecting hole, and a mass part provided on the circumference direction intermediate part of the elastic deformation area. Thus, in relation to input of vibration of a frequency correlating to the resonance frequency of the mass-spring system, the connecting hole is opened using the resonance of the mass-spring system, and an attempt is made to have lower dynamic spring by communication of the pressure receiving chamber and the equilibrium chamber. Furthermore, the resonance frequency of the mass-spring system is set to 50 Hz or greater, and the tuning frequency of the orifice passage is set to a lower frequency than the resonance frequency of the mass-spring system, so at the time of input of vibration of the frequency to which the orifice passage is tuned, opening in a resonant state of the connecting hole is avoided, and a vibration damping effect by the orifice passage is effectively exhibited.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein:

FIGS. 9A and 9B are enlarged cross section views of a principal part of the engine mount of FIG. 1, where FIG. 9A shows the state with a lower through hole closed by the movable rubber film, and FIG. 9B shows the state with the lower through hole opened;

DETAILED DESCRIPTION OF PREFERRED EMBODIMENTS

Following, we will describe embodiments of the present invention while referring to the drawings.

Figure 1:
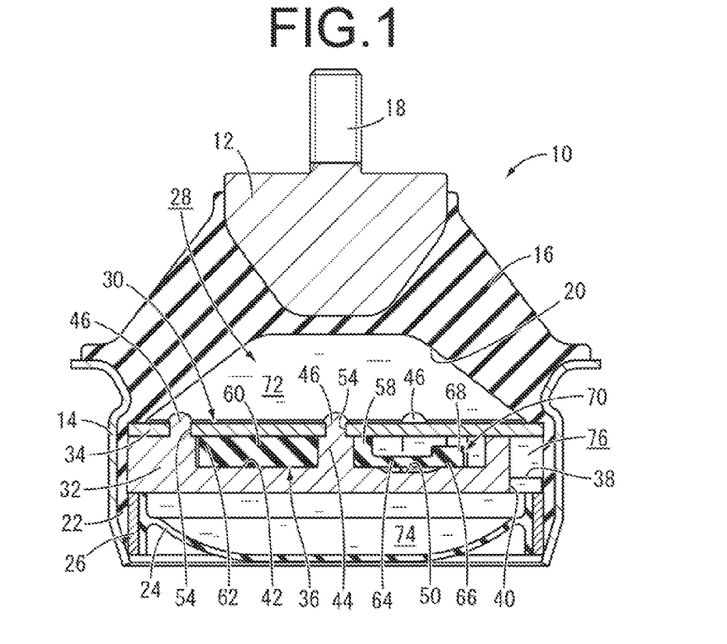
FIG. 1 is a vertical cross section view showing a fluid-filled vibration damping device in the form of an engine mount as a first embodiment of the present invention, taken along line 1-1 of FIG. 4.
Figure 2:
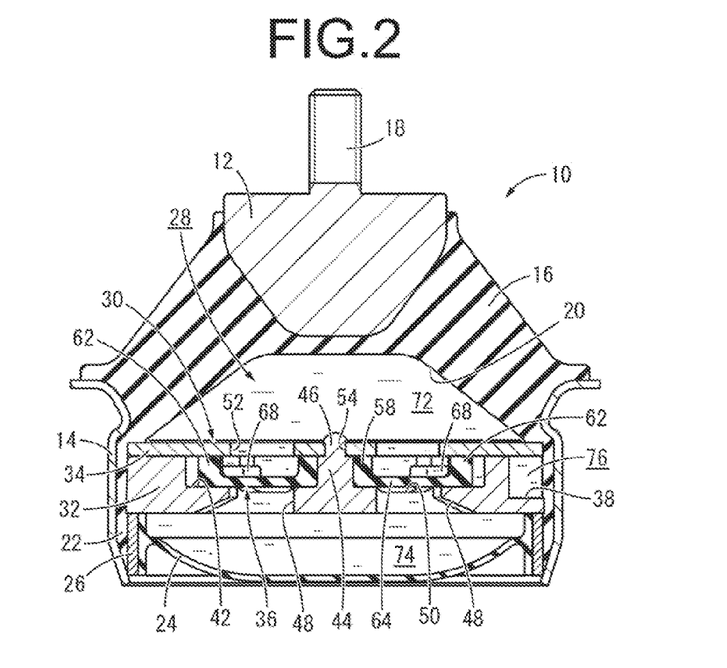
FIG. 2 is a vertical cross section view of the engine mount shown in FIG. 1, taken along line 2-2 of FIG. 4.

FIGS. 1 and 2 show an engine mount 10 for an automobile as a first embodiment of a fluid-filled vibration damping device constituted according to the present invention. The engine mount 10 has a constitution wherein a first mounting member 12 and a second mounting member 14 are elastically connected to each other by a main rubber elastic body 16. With the description below, as a rule, the vertical direction means the vertical direction in FIG. 1 which is the main vibration input direction.

In more specific detail, the first mounting member 12 is a member having a circular block shape or an inverted roughly circular truncated cone shape formed using iron, aluminum alloy or the like, and a fixing bolt 18 projecting upward on a center axis is provided.

The second mounting member 14 is a highly rigid member, the same as the first mounting member 12, has a thin-walled large diameter, roughly cylindrical shape overall, wherein its top end part has a groove shape that extends along the entire circumference at the vertical cross section of a protrusion to the inner circumference side, while the bottom end part gradually reduces its diameter facing downward.

Then, the first mounting member 12 is arranged separated upward on the same center axis in relation to the second mounting member 14, and the first mounting member 12 and the second mounting member 14 are elastically connected to each other by the main rubber elastic body 16. The main rubber elastic body 16 has a thick-walled, large diameter roughly truncated cone shape, wherein the small diameter side end part is adhered by vulcanization to the first mounting member 12, while the large diameter side end part is adhered by vulcanization to the top end part of the second mounting member 14. By so doing, the main rubber elastic body 16 is formed as an integrally vulcanization molded component equipped with the first mounting member 12 and the second mounting member 14.

Furthermore, a large diameter recess 20 is formed on the main rubber elastic body 16. The large diameter recess 20 is a recess having an inverted roughly mortar shape, and it opens to the large diameter side end surface of the main rubber elastic body 16. Therefore, the main rubber elastic body 16 has a vertical cross section shape that extends slanting so as to expand facing downward between the first mounting member 12 and the second mounting member 14.

Furthermore, a sealing rubber layer 22 is integrally formed on the main rubber elastic body 16. The sealing rubber layer 22 is a rubber film exhibiting a thin-walled, large diameter roughly cylindrical shape, and projects facing downward from the outer circumference side of the opening part of the large diameter recess 20, and is fixed so as to cover the inner circumference surface of the second mounting member 14.

Also, a flexible film 24 is attached to the integrally vulcanization molded component of the main rubber elastic body 16. The flexible film 24 is a thin-walled, large diameter rubber film having an inverted roughly circular dome shape, and has sufficient looseness vertically to be able to deform easily. Furthermore, a fixing member 26 is adhered by vulcanization to the flexible film 24. The fixing member 26 is a highly rigid metal fitting having a large diameter roughly cylindrical shape, and is adhered by vulcanization to the outer circumference surface of the flexible film 24. Then, the flexible film 24 is inserted at the lower end opening part of the second mounting member 14, and the fixing member 26 is fit and fixed to the lower end part of the second mounting member 14 by shrink processing of the second mounting member 14. With this embodiment, the lower end part of the second mounting member 14 is processed to have a tapered shape that becomes smaller in diameter facing downward after insertion of the fixing member 26 into the second mounting member 14, thereby preventing the fixing member 26 from falling out downward from the second mounting member 14.

By the flexible film 24 being attached to the integrally vulcanization molded component of the main rubber elastic body 16 in this way, the top side opening part of the second mounting member 14 is closed by the main rubber elastic body 16, and the lower side opening part of the second mounting member 14 is closed by the flexible film 24. By so doing, a fluid chamber 28 separated from the external space is defined between the facing surfaces of the main rubber elastic body 16 and the flexible film 24, and non-compressible fluid is sealed in the fluid chamber 28. The non-compressible fluid filled in the fluid chamber 28 is not particularly limited, but it is possible to use water, ethylene glycol, alkylene glycol, polyalkylene glycol, silicone oil, or a mixed liquid of these, and more preferably, to use a low viscosity fluid of 0.1 Pa·s or less.

Figure 3:
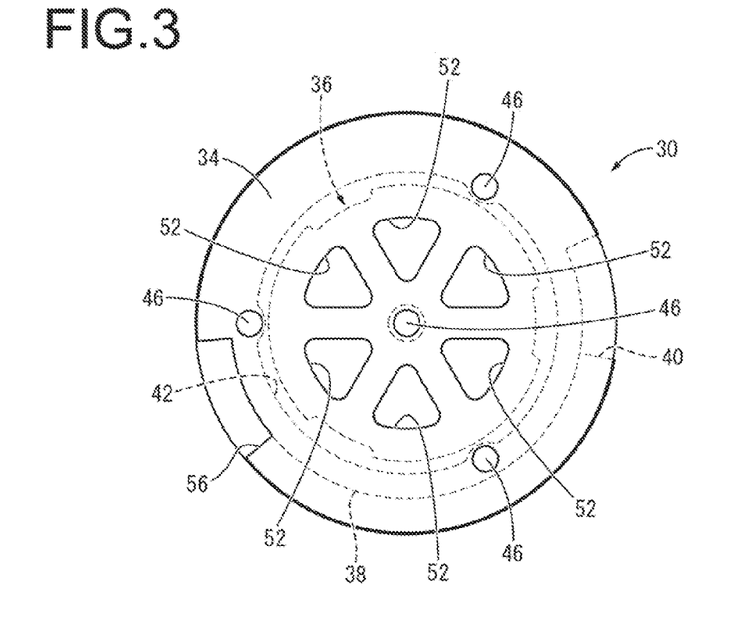
FIG. 3 is a plan view of a partition member of the engine mount shown in FIG. 1.
Figure 4:
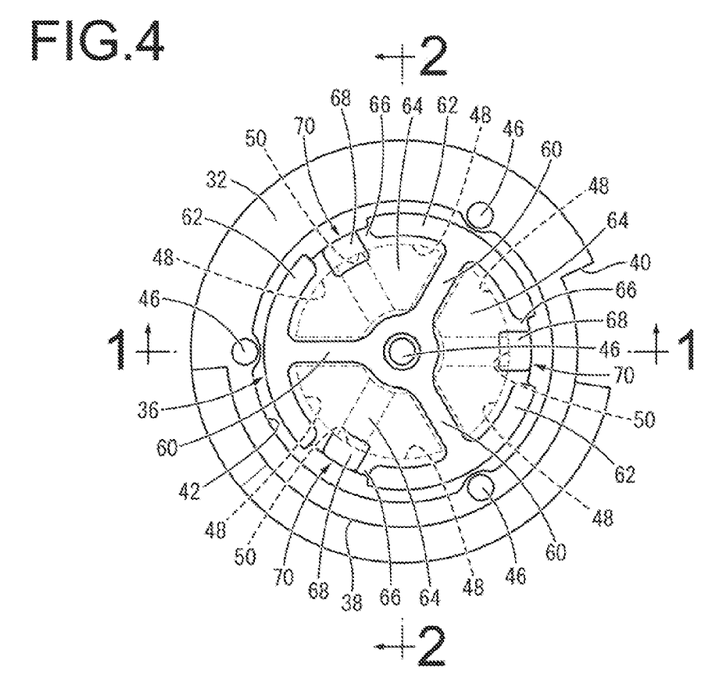
FIG. 4 is a plan view showing the state with a lid plate member removed for the partition member of FIG. 3.
Figure 5:
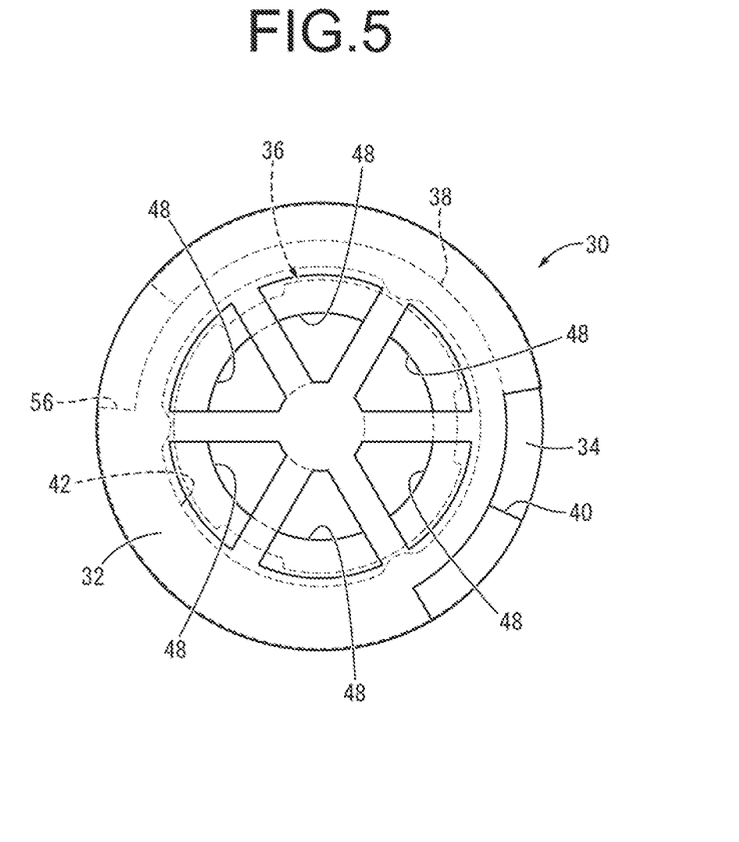
FIG. 5 is a bottom view of the partition member of FIG. 3.

A partition member 30 shown in FIGS. 3 to 5 is arranged in this fluid chamber 28. The partition member 30 has a constitution whereby a partition member main unit 32 and a lid plate member 34 are combined, and a movable rubber film 36 is attached thereto as a closing rubber elastic plate.

The partition member main unit 32 is a hard member formed using synthetic resin, metal or the like, and has a thick-walled, large diameter roughly round disk shape. Also, a circumferential groove 38 extending continuously for a designated length in the circumference direction (slightly less than half the circumference with this embodiment) and opening at the top surface and outer circumference surface is formed on the outer circumference end part of the partition member main unit 32. Then, one end part of the circumference direction of the circumferential groove 38 has a slope shape gradually slanted upward as the lower wall part top surface goes to the long direction outside, and on the other end part of the circumference direction of the circumferential groove 38, a lower opening part 40 that pierces through the lower wall part is formed to open at the lower surface of the partition member main unit 32.

Also, as shown in FIG. 4, at the radial direction center part of the partition member main unit 32, a housing recess 42 is formed to open at the top surface. The housing recess 42 is a recess having a designated vertical depth with a roughly constant circular lateral cross section, and a center projection 44 with a small diameter round pillar shape that rises upward from the bottom wall part is formed at the radial direction center. Furthermore, on the center projection 44 and at a plurality of locations of the circumference wall part of the housing recess 42, locking projections 46 that project upward are respectively formed.

Furthermore, as shown in FIG. 5, at the bottom wall part of the housing recess 42, a lower through hole 48 as a connecting hole is formed by piercing, and a plurality (six with this embodiment) are arranged aligned in the circumference direction. With these lower through holes 48, the top part which is the housing recess 42 side extends vertically in a roughly constant hole cross section shape, and the bottom part which is the equilibrium chamber 74 side (described later) extends vertically expanding to the outer circumference side facing downward, and the hole cross section area becomes larger as it moves downward.

Furthermore, between lower through holes 48, 48 adjacent in the circumference direction, a shallow bottom communication groove 50 extending in the circumference direction and opening at the top surface of the bottom wall part of the housing recess 42 is formed. With the communication groove 50, the circumference direction end part is in communication with the lower through holes 48, and with this embodiment, three sets of lower through holes 48, 48 connected to each other in the circumference direction by the communication groove 50 are arranged at equal intervals on the circumference.

The lid plate member 34 is a hard member, the same as the partition member main unit 32, and has a thin-walled, large diameter roughly round disk shape. Furthermore, as shown in FIG. 3, on the radial direction inner circumference part of the lid plate member 34, a plurality (six with this embodiment) of upper through holes 52 are formed to pierce through in the thickness direction. Furthermore, at the radial direction center part of the lid plate member 34 and at the outer circumference side of the upper through holes 52, locking holes 54 are formed piercing through in the thickness direction respectively at positions corresponding to the locking projections 46 of the partition member main unit 32. Furthermore, an upper opening part 56 that pierces through a portion on the circumference in the thickness direction is formed on the outer circumference end part of the lid plate member 34.

Then, the lid plate member 34 is overlapped from above on the partition member main unit 32, and after the locking projections 46 of the partition member main unit 32 are respectively inserted in the corresponding locking holes 54 of the lid plate member 34, by the tip end part of the locking projections 46 being crushed and expanded, they are locked in the vertical direction to the opening circumference edge part of the locking holes 54, and the partition member main unit 32 and the lid plate member 34 are fixed so as to be inseparable. It is also possible to arrange the three locking projections 46, 46, 46 formed on the circumference wall part of the housing recess 42 and the corresponding locking holes 54, 54, 54 at uneven intervals on the circumference, or to make the shape of the plurality of sets of the locking projections 46 and the locking holes 54 be mutually different or the like, so that the partition member main unit 32 and the lid plate member 34 are aligned relatively in the circumference direction.

Furthermore, by fixing the partition member main unit 32 and the lid plate member 34 to each other, the upper side opening of the circumferential groove 38 is covered by the lid plate member 34, and the opening part of the housing recess 42 is covered by the lid plate member 34. The upper through hole 52 of the lid plate member 34 is formed on the part covering the opening part of the housing recess 42, and is in communication with the housing recess 42.

Figure 6:
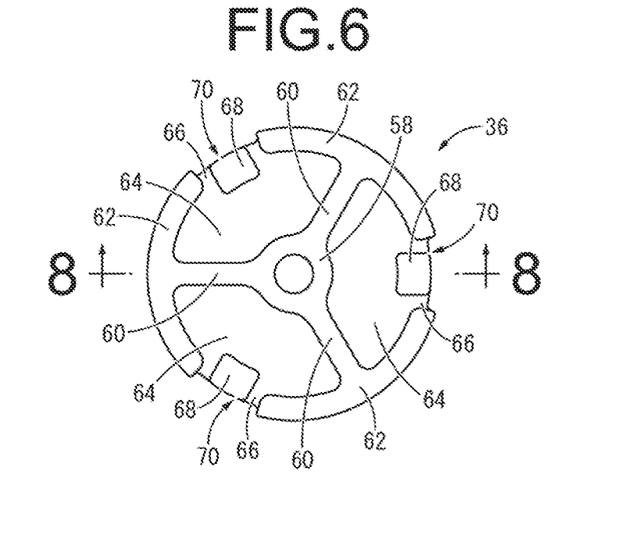
FIG. 6 is a plan view of a movable rubber film of the partition member of FIG. 3.
Figure 7:
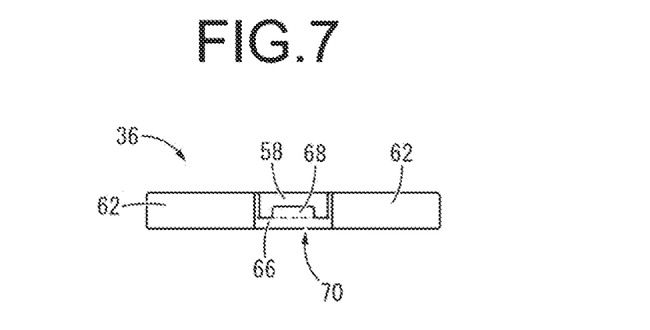
FIG. 7 is a right side view of the movable rubber film shown in FIG. 6.
Figure 8:
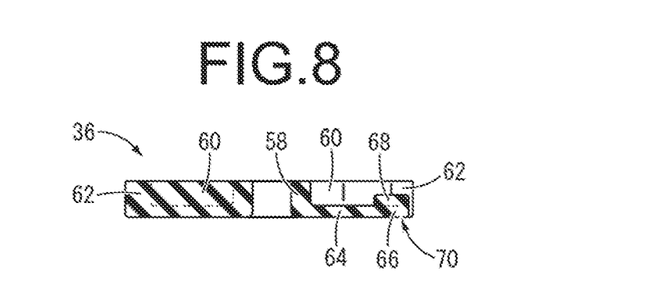
FIG. 8 is a cross section view taken along line 8-8 of FIG. 6.

As shown in FIG. 4, on the housing recess 42 of the partition member main unit 32, the movable rubber film 36 is arranged as the closing rubber elastic plate. As shown in FIGS. 6 to 8, the movable rubber film 36 has an overall roughly round disk shape, and is formed, for example, from a rubber elastic body, a resin elastomer or the like. Also, at the radial direction center part of the movable rubber film 36, a roughly cylinder shaped center attachment part 58 is integrally formed projecting facing upward.

In addition, three spoke shaped retaining parts 60, 60, 60 are provided on the movable rubber film 36. The spoke shaped retaining parts 60 are projections extending in radial form toward the outer circumference side from the center attachment part 58 projecting upward, and with this embodiment, the three spoke shaped retaining parts 60, 60, 60 are formed at equal intervals in the circumference direction. Furthermore, three abutting retaining parts 62, 62, 62 are integrally formed on the movable rubber film 36. The abutting retaining parts 62 are projections extending in the circumference direction at the outer circumference end part of the movable rubber film 36 and projecting upward, and three are provided separated at designated intervals in the circumference direction. Also, at the circumference direction center part of the abutting retaining part 62, the outer circumference end part of each of the spoke shaped retaining parts 60 is integrally connected. Said another way, each abutting retaining part 62 is integrally formed so as to extend facing the circumference direction both sides from the outer circumference end part of the corresponding spoke shaped retaining part 60.

Then, there is a thick-walled elastic film part 64 surrounded by the spoke shaped retaining parts 60, 60 and the abutting retaining parts 62, 62 between the adjacent spoke shaped retaining parts 60, 60 in the circumference direction on the circumference with the movable rubber film 36. Furthermore, the outer circumference end part of each elastic film part 64 is a relief film part 66 as an elastic deformation area. The relief film parts 66 which are thin-walled films can be easily elastically deformed in the thickness direction, and are formed in the circumference direction between abutting retaining parts 62, 62 adjacent in the circumference direction at three locations on the circumference of the movable rubber film 36.

Besides, a thick wall part 68 is integrally formed as a mass part on the relief film part 66 and the elastic film part 64. The thick wall part 68 is made to have a thicker wall than the relief film part 66 and the elastic film part 64, and projects further upward than the relief film part 66 and the elastic film part 64. In this embodiment, with a top surface view, it has a roughly round arc shape or a roughly square shape extending in the circumference direction. Furthermore, the thick wall parts 68 are provided at the circumference direction intermediate part of each relief film part 66, and are separated by a designated distance in the circumference direction with respect to the abutting retaining parts 62, 62 arranged at both sides of the circumference direction of the relief film parts 66. The thick wall parts 68 and the abutting retaining parts 62, 62 are elastically connected by the relief film parts 66. Additionally, the thick wall parts 68 are provided at the outer circumference end part of the movable rubber film 36, said another way, at the outer circumference end part of the relief film parts 66, while extending to the inner circumference side beyond the relief film parts 66 and the inner circumference parts of the thick wall parts 68 are positioned on the elastic film parts 64. Moreover, the thick wall parts 68 are arranged separated to the outer circumference side of the center attachment part 58, and the thick wall parts 68 and the center attachment part 58 are elastically connected by the elastic film parts 64.

The thick wall parts 68 have upward projection dimensions smaller than that of the center attachment part 58, the spoke shaped retaining parts 60, and the abutting retaining parts 62, and the top surface of the thick wall parts 68 is positioned downward in relation to each of those top surfaces. With this embodiment, the top surface of each of the center attachment part 58, the spoke shaped retaining parts 60, and the abutting retaining parts 62 are positioned on roughly the same axis perpendicular plane. Also, the thick wall parts 68 of this embodiment are integrally formed with the film parts 64, 66 of a rubber material the same as the relief film parts 66 and the elastic film parts 64, but for example, it is also possible to form the thick wall parts 68 (mass parts) integrally with two color molding using rubber material, resin elastomer or the like with a larger specific gravity than that of the aforementioned rubber material, and also possible to adhere a different member such as of metal or the like later, having them formed as separate items.

By having the thick wall parts 68 elastically supported by the relief film parts 66 and the elastic film parts 64 in this way, the mass-spring system 70 is constituted with the thick wall part 68 as the mass, and also using the relief film parts 66 and the elastic film parts 64 as the spring. With this mass-spring system 70, the resonance frequency is set to a high frequency of 50 Hz or greater, and is preferably set to 50 to 200 Hz, and with this embodiment, it is tuned to 50 to 150 Hz which corresponds to the driving rumble of an automobile. Furthermore, with this embodiment, mass-spring systems 70 are provided respectively between the three abutting retaining parts 62, 62, 62 in the circumference direction, those three mass-spring systems 70, 70, 70 are given mutually roughly the same shape and size, and the resonance frequencies of the mass-spring systems 70, 70, 70 are set to be mutually roughly the same.

Also, the resonance frequency of the mass-spring system 70 with the movable rubber film 36 is adjusted according to the frequency range of the vibration that is subject to vibration damping. For example, considering vibration due to torque fluctuation, road noise or the like which is a problem for each vehicle, with low speed travel noise as the object, tuning can be done at about 50 to 100 Hz, and with high speed travel noise as the object, it is possible to do tuning to about 100 to 200 Hz. The resonance frequency of the mass-spring system 70 is the resonance frequency in a state with the movable rubber film 36 arranged in the non-compressible fluid of the fluid chamber 28 as described later, and is not the resonance frequency of a standalone movable rubber film 36 in the air.

Then, the movable rubber film 36 is arranged housed in the housing recess 42 of the partition member main unit 32, and by having the center projection 44 of the partition member main unit 32 fit into the inner hole of the center attachment part 58 with the movable rubber film 36 and attached in a fixed state, the movable rubber film 36 is aligned elastically within the housing recess 42. Furthermore, by having the partition member main unit 32 and the lid plate member 34 vertically overlapped and fixed, the center attachment part 58, the spoke shaped retaining parts 60, and the abutting retaining parts 62 of the movable rubber film 36 are vertically compressed between the partition member main unit 32 and the lid plate member 34, and are elastically supported by the partition member main unit 32 and the lid plate member 34. As is clear from the description above, the three spoke shaped retaining parts 60, 60, 60 of the movable rubber film 36 are positioned in the circumference direction between the six lower through holes 48, 48, ..., 48, the three communication grooves 50, 50, 50, and the six upper through holes 52, 52, ..., 52, while the center attachment part 58 and the abutting retaining parts 62 are positioned apart from the upper and lower through holes 48 and 52 to the inner circumference side and to the outer circumference side, respectively.

Furthermore, with the elastic film part 64 and the relief film part 66, the bottom surface is overlapped in a contact state with the lower wall part of the housing recess 42 of the partition member main unit 32, and the lower through hole 48 is closed by the lower through hole 48 and the upper opening of the communication groove 50 being covered by the elastic film part 64. Additionally, each set constituted by the lower through holes 48, 48 adjacent on the circumference and the communication groove 50 connecting those lower through holes 48, 48 is covered by each elastic film part 64, and the circumference direction center part of each elastic film part 64 faces vertically to the bottom wall part of the communication groove 50. Also, the top surfaces of the elastic film part 64 and the relief film part 66 are separated downward in relation to the lid plate member 34, and the top surface of the thick wall part 68 also faces separated by a designated distance downward in relation to the lid plate member 34.

The partition member 30 constituted as described above is arranged housed in the fluid chamber 28. More specifically, with the partition member 30, the outer circumference end part of the top surface is inserted in relation to the second mounting member 14 until it abuts the large diameter side end surface of the main rubber elastic body 16, and by the second mounting member 14 being shrunk in all-directions or the like, the partition member 30 is supported by the second mounting member 14. Furthermore, with the partition member 30, the outer circumference edge end part is sandwiched vertically between the main rubber elastic body 16 and the fixing member 26, and is aligned in the vertical direction.

By the partition member 30 being arranged so as to broaden in the axis perpendicular direction within the fluid chamber 28 in this way, the fluid chamber 28 is divided in two vertically in relation to the partition member 30. Specifically, at one side (the upper side) in relation to the partition member 30, with its wall partially defined by the main rubber elastic body 16, a pressure receiving chamber 72 for which pressure fluctuation occurs during vibration input is formed, and at the other side (lower side) in relation to the partition member 30, with its wall partially defined by the flexible film 24, an equilibrium chamber 74 for which capacity changes occur easily is formed. In other words, the fluid chamber 28 is partitioned into the pressure receiving chamber 72 and the equilibrium chamber 74 by the partition member 30, and the non-compressible fluid of the fluid chamber 28 is sealed in the pressure receiving chamber 72 and the equilibrium chamber 74.

Moreover, the outer circumference surface of the partition member 30 is covered to be fluid tight by the second mounting member 14 via the sealing rubber layer 22, so at the partition member 30, the circumferential groove 38 that opens at the outer circumference surface of the partition member main unit 32 is covered to be fluid tight, and a tunnel shaped flow path that extends by a designated length in the circumference direction is formed. Then, one end part of the tunnel shaped flow path is connected to the pressure receiving chamber 72 by the upper opening part 56 of the lid plate member 34, and the other end part is connected to the equilibrium chamber 74 by the lower opening part 40 of the partition member main unit 32. By so doing, an orifice passage 76 that mutually connects the pressure receiving chamber 72 and the equilibrium chamber 74 is formed using the circumferential groove 38. With the orifice passage 76, the tuning frequency which is the resonance frequency of the flowing fluid is set to a lower frequency than the resonance frequency of the mass-spring system 70, and preferably is set to about 5 to 15 Hz so that it is a sufficiently lower frequency than the resonance frequency of the mass-spring system 70. With the orifice passage 76 of this embodiment, by adjusting the ratio (A/L) of the path cross section area (A) to the path length (L), this is tuned to about 10 Hz which correlates to engine shake. Naturally, the tuning frequency of the orifice passage 76 is acceptable as long as it is set to a frequency lower than the resonance frequency of the mass-spring system 70, and aside from the engine shake vibration shown as an example, it is also possible to set to a frequency range of engine idling vibration or the like.

Furthermore, on the movable rubber film 36 of the partition member 30, the fluid pressure of the pressure receiving chamber 72 is applied to the top surface through the upper through holes 52, and the fluid pressure of the equilibrium chamber 74 is applied through the lower through holes 48 to the lower surface. By so doing, based on the relative pressure difference between the pressure receiving chamber 72 and the equilibrium chamber 74 when vibration is input, the elastic film parts 64 and the relief film parts 66 of the movable rubber film 36 are made to elastically deform. With this embodiment, by the communication groove 50 that connects the lower through holes 48 to the bottom wall top surface of the housing recess 42 being provided, the fluid pressure of the equilibrium chamber 74 is made to be applied in a broader range by the bottom surface of the movable rubber film 36.

With the engine mount 10 constituted in this way, the first mounting member 12 is attached to a power unit (not illustrated) by the fixing bolt 18, the second mounting member 14 is attached to a vehicle body (not illustrated), and the engine mount 10 is thus mounted in the vehicle. Then, in the state with the engine mount 10 mounted in the vehicle, the power unit is given vibration damping support on the vehicle body via the engine mount 10.

In this vehicle mounted state of the engine mount 10, when low frequency, large amplitude vibration corresponding to engine shake is input between the first mounting member 12 and the second mounting member 14, by the relative pressure fluctuation of the pressure receiving chamber 72 and the equilibrium chamber 74, fluid flow is generated through the orifice passage 76. This exhibits the target vibration damping effect (high attenuation effect) based on the flow action such as the resonance action of the fluid or the like.

Furthermore, the free length of the elastic film parts 64 and the relief film parts 66 with the movable rubber film 36 is limited by the center attachment part 58, the spoke shaped retaining parts 60, and the abutting retaining parts 62, so the elastic deformation volume in the thickness direction of the elastic film parts 64 and the relief film parts 66 is limited. Because of that, the elastic deformation of the elastic film parts 64 and the relief film parts 66 cannot follow the input of low frequency, large amplitude vibration corresponding to engine shake, escaping of the fluid pressure is decreased, and the relative pressure difference between the pressure receiving chamber 72 and the equilibrium chamber 74 is obtained at a sufficiently high level. As a result, the volume of fluid flowing through the orifice passage 76 is advantageously ensured, and it is possible to efficiently obtain the vibration damping effect exhibited by the fluid flow action.

In addition, with this embodiment, the circumference direction center parts of the elastic film parts 64 face opposite vertically in relation to the bottom wall part of the communication groove 50, and the volume of elastic deformation of the elastic film parts 64 is also limited by abutting on the bottom wall part of the communication groove 50. Because of that, the fluid pressure absorbing action by the elastic deformation of the elastic film parts 64 is limited, and the vibration damping effect by the orifice passage 76 is more effectively exhibited.

Figure 9A:
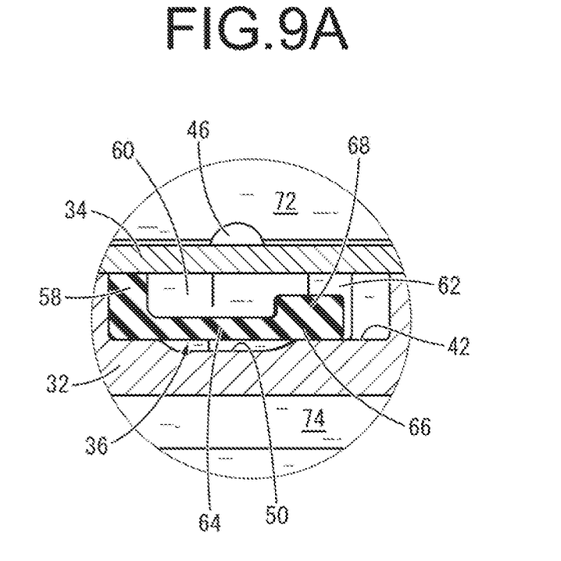
Figure 9B:
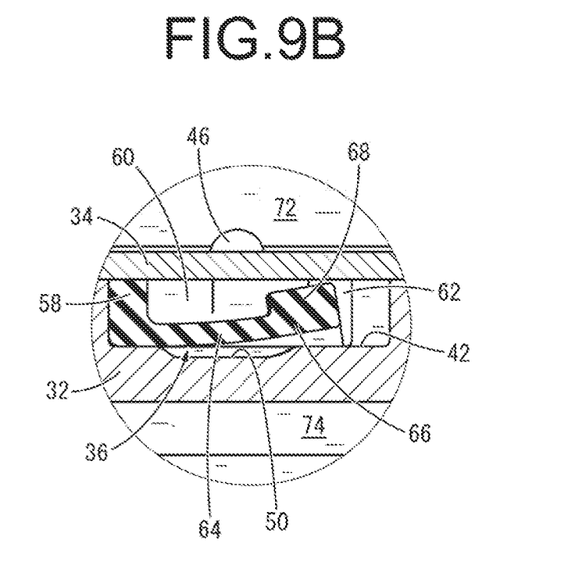

Meanwhile, when a high frequency vibration of 50 Hz or greater corresponding to driving rumble or the like is input between the first mounting member 12 and the second mounting member 14, the orifice passage 76 tuned to a low frequency is essentially closed by anti-resonance. Also, as shown in FIGS. 9A and 9B, due to the resonance of the mass-spring systems 70 provided on the movable rubber film 36, the thick wall parts 68 are actively displaced in the vertical direction, and the relief film parts 66 and the elastic film parts 64 that support the thick wall parts 68 are elastically deformed in the film thickness direction. As a result, the relief film parts 66 and the elastic film parts 64 separate from the upper opening of the communication groove 50 of the partition member 30, and the lower through holes 48 are opened to the pressure receiving chamber 72 side via the communication groove 50. This communicates the pressure receiving chamber 72 and the equilibrium chamber 74 with each other via the upper and lower through holes 48 and 52, the housing recess 42, and the communication groove 50, and the relative pressure fluctuation of the pressure receiving chamber 72 in relation to the equilibrium chamber 74 rapidly decreases or disappears. Consequently, higher dynamic spring due to substantial closing of the pressure receiving chamber 72 is avoided, and the vibration insulation effect is effectively exhibited.

In particular, the closing of the lower through holes 48 by the movable rubber film 36 is released, and the pressure receiving chamber 72 and the equilibrium chamber 74 are in direct communication, so lower dynamic spring is more effectively realized, and the target vibration damping effect can be obtained efficiently.

In fact, three of the same shaped mass-spring systems 70 are provided on the circumference of the movable rubber film 36, and by mass-spring systems 70, 70, 70 having the same resonance frequency each resonating, the vibration insulation effect by lower dynamic spring can be even more effectively exhibited.

Furthermore, with this embodiment, the mass part of the mass-spring system 70 is constituted by the thick wall part 68 which is made by the circumference direction intermediate part of the relief film part 66 being made partially thicker. That is, it is integrally formed of the same material as the relief film part 66. This decreases the number of parts, and makes mass part molding easier. Moreover, by changing the shape and size of the thick wall part 68, it is possible to easily adjust the mass and the spring characteristics of the mass-spring system 70.

In addition, for input of high frequency, small amplitude vibration, even by the elastic film parts 64 of the movable rubber film 36 that cover the lower through holes 48 elastically deforming to the thickness direction by the relative internal pressure fluctuation of the pressure receiving chamber 72 and the equilibrium chamber 74, the fluid pressure of the pressure receiving chamber 72 is absorbed, and the vibration insulation effect is exhibited. Therefore, with the engine mount 10 of this embodiment, for input of high frequency, small amplitude vibration, by minute deformation of the elastic film parts 64 and mutual communication of the pressure receiving chamber 72 and the equilibrium chamber 74 using the resonance of the mass-spring systems 70, a vibration insulation effect by fluid pressure absorbing action is advantageously exhibited.

Also, the resonance frequency of the mass-spring system 70 is set to 50 Hz or greater, and the tuning frequency of the orifice passage 76 is set to a lower frequency than the resonance frequency of the mass-spring system 70. In particular, with this embodiment, by the orifice passage 76 being tuned to 5 to 15 Hz, the resonance frequency of the mass-spring system 70 and the tuning frequency of the orifice passage 76 are set to sufficiently separated frequencies. Because of that, during input of low frequency vibration corresponding to engine shake to which the orifice passage 76 is tuned, active elastic deformation of the movable rubber film 36 by resonance of the mass-spring system 70 cannot be generated, and escaping of the fluid pressure due to opening of the lower through holes 48 is avoided, so the vibration damping effect due to fluid flow through the orifice passage 76 is effectively exhibited.

In other words, when improving the vibration damping performance of the high frequency range, by greatly elastically deforming the relief film parts 66 of the movable rubber film 36 using the resonance phenomenon, the lower through holes 48 are made to be in a communication state. By so doing, by setting a high spring rigidity for the movable rubber film 36 including the relief film parts 66, even during low frequency vibration input, during input of an impact load to a level at which cavitation will not occur or the like, it is possible to effectively prevent the occurrence of the phenomenon of pressure leaking by unnecessary communication of the lower through holes 48 due to large deformation of the movable rubber film 36. As a result, it enables to realize at a higher level all items including the orifice vibration damping effect on low frequency vibration, the vibration damping effect by lower dynamic spring on high frequency vibration, and the effect of preventing cavitation by a large impact load.

Also, when there is a significant decrease in the internal pressure of the pressure receiving chamber 72 due to input of an impact load, input of an excessively large amplitude vibration or the like, the elastic film parts 64 and the relief film parts 66 of the movable rubber film 36 are elastically deformed in the thickness direction based on the pressure difference of the pressure receiving chamber 72 and the equilibrium chamber 74. Then, the outer circumference parts of the elastic film parts 64 and the relief film parts 66 separate from the bottom wall part of the housing recess 42, and the lower through holes 48 switch to a communication state. This communicates the pressure receiving chamber 72 and the equilibrium chamber 74 through the upper and lower through holes 48 and 52, the housing recess 42, and the communication groove 50, and the negative pressure of the pressure receiving chamber 72 decreases or disappears as quickly as possible, so the generation of cavitation bubbles is prevented, and noise that occurs during elimination of the cavitation bubbles is prevented.

Figure 10:
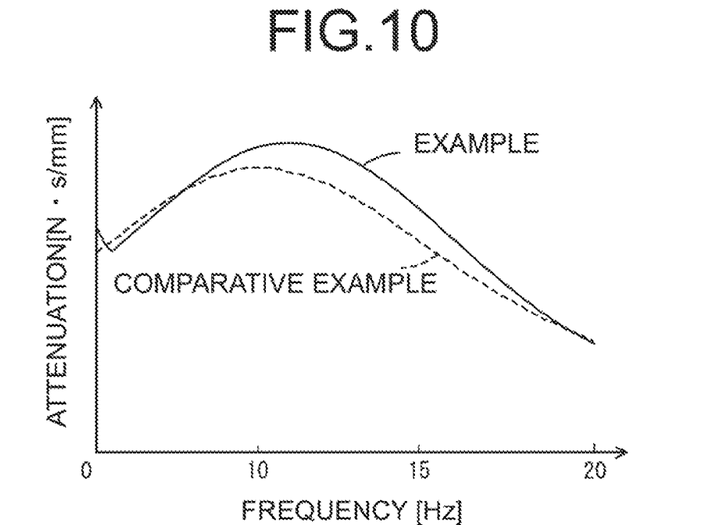
FIG. 10 is a graph showing the attenuation characteristics of the engine mount of the first embodiment.
Figure 11:
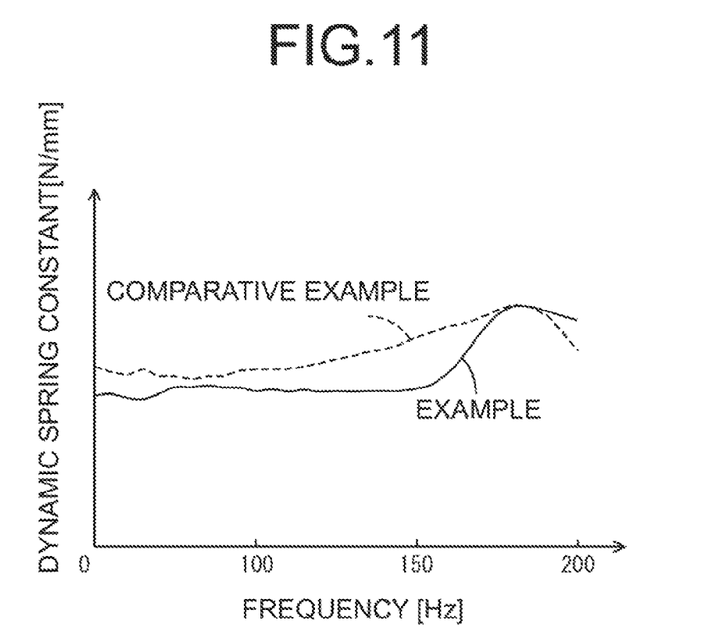
FIG. 11 is a graph showing the spring characteristics of the engine mount of the first embodiment.

The realization of both high attenuation performance during input of low frequency, large amplitude vibration, and lower dynamic spring during input of high frequency, small amplitude vibration is also confirmed by the actual characteristics measurement results shown in FIGS. 10 and 11. In FIGS. 10 and 11, the Examples shown by the solid line are actual characteristics measurement results for the fluid-filled vibration damping device of the present invention, while the Comparative Examples shown by the dotted lines are actual characteristics measurement results for the fluid-filled vibration damping device of U.S. Pat. No. 8,556,239.

Specifically, FIG. 10 shows a graph of attenuation characteristics in relation to the input of low frequency, large amplitude vibration. According to this, at the low frequency range of 5 to 20 Hz, it was confirmed that roughly the same or higher vibration attenuation performance is exhibited with the Example compared to the Comparative Example. One possible reason for the attenuation of the Example being greater than that of the Comparative Example with the actual measurement results of FIG. 10, would be that the thick wall parts 68 are provided on the relief film parts 66 to easily limit opening of the lower through holes 48 due to elastic deformation of the relief film parts 66 in the frequency range apart from the resonance frequency of the mass-spring system 70.

Also, FIG. 11 shows a graph of dynamic spring characteristics in relation to input of high frequency, small amplitude vibration. According to this, it was confirmed that the Example exhibits lower dynamic spring characteristics and can advantageously obtain the vibration insulation effect in comparison to the Comparative Example in the frequency range of about 50 to 180 Hz.

From these actual measurement results of characteristics, with the fluid-filled vibration damping device of the present invention (Example), it was confirmed that compared to the fluid-filled vibration damping device of a prior art constitution (Comparative Example), the vibration attenuation effect by the orifice passage 76 is effectively exhibited on input of low frequency, large amplitude vibration, and the vibration insulation effect by the lower dynamic spring is more effectively exhibited on input of high frequency, small amplitude vibration.

Above, we gave a detailed description of an embodiment of the present invention, but the present invention is not limited to that specific description. For example, with the embodiment, mass-spring systems 70 were respectively provided between three abutting retaining parts 62, 62, 62, but the mass-spring systems 70 do not have to be provided between all the abutting retaining parts 62, 62, and for example only one mass-spring system 70 can be provided on the circumference.

Moreover, when a plurality of the mass-spring systems 70 are provided, it is possible to set the resonance frequency of each mass-spring system 70 to be roughly the same as each other as described in the preceding embodiment, but, for example, by having the resonance frequency of each mass-spring system 70 be different from each other, it is also possible to have the lower through holes 48 be in communication by the resonance of the mass-spring systems 70 in relation to a plurality of types of vibration with differing frequencies.

Also, the mass part does not have to be thick walled in relation to the elastic deformation area, and for example, if the mass part is formed with a metal or the like that has a different density from the closing rubber elastic plate, it is also possible to adjust the mass of the mass part with the same thickness as that of the elastic deformation area. As long as the resonance frequency of the mass-spring system 70 can be set as appropriate, it is possible to constitute the mass part using a part of the elastic deformation area, without having the material and shape be different.

Furthermore, in addition to integrally forming the mass part with the elastic deformation area, it is also possible to form it by adhering a separate metal plate or the like. It is also possible to provide a plurality of mass parts separated on the circumference on one elastic deformation area.

Also, the movable rubber film 36 shown in the embodiment is simply an example of the closing rubber elastic plate, and the specific structure thereof is not limited. Specifically, the center attachment part 58 and the spoke shaped retaining parts 60 of the movable rubber film 36 are not absolutely essential, and can be omitted.

In addition, with this embodiment, we described a specific example of the present invention used for an automobile engine mount, but it is also possible to apply this invention to an automobile body mount or differential mount, a suspension member mount, a suspension bush or the like, as well as to a fluid-filled vibration damping device for doing vibration damping of various vibrating bodies other than of automobiles.

What is claimed is:

1. A fluid-filled vibration damping device comprising:
a first mounting member;
a second mounting member;
a main rubber elastic body elastically connecting the first mounting member and the second mounting member;
a pressure receiving chamber whose wall is partially defined by the main rubber elastic body;
an equilibrium chamber whose wall is partially defined by a flexible film;
a partition member partitioning the pressure receiving chamber and the equilibrium chamber from each other;
a non-compressible fluid sealed in the pressure receiving chamber and the equilibrium chamber;
an orifice passage mutually connecting the pressure receiving chamber and the equilibrium chamber;
at least one connecting hole provided through the partition member to communicate the pressure receiving chamber and the equilibrium chamber; and
a closing rubber elastic plate provided such that the closing rubber elastic plate is overlapped from a pressure receiving chamber side on the connecting hole to close the connecting hole, the closing rubber elastic plate is opened based on elastic deformation, and a pressure of the pressure receiving chamber is applied to a first surface of the closing rubber elastic plate, while a pressure of the equilibrium chamber is applied through the connecting hole to a second surface of the closing rubber elastic plate,
wherein the closing rubber elastic plate includes a plurality of abutting retaining parts at its outer circumference edge part, the abutting retaining parts are held in an overlapping state to the partition member, and are spaced away from one another in a circumference direction,
wherein between adjacent abutting retaining parts in the circumference direction, the closing rubber elastic plate includes at least one elastic deformation area configured to be elastically deformed based on a pressure difference between the pressure receiving chamber and the equilibrium chamber to be separated from the partition member and to open the connecting hole, allowing fluid flow action between the pressure receiving chamber and the equilibrium chamber through the connecting hole, and
wherein at least one mass part is provided at an intermediate part of the elastic deformation area in the circumference direction, the at least one mass part and the elastic deformation area constitute at least one mass-spring system, a resonance frequency of the mass-spring system is tuned to 50 Hz or greater, and a tuning frequency of the orifice passage is set to a lower frequency than the resonance frequency of the mass-spring system.

2. The fluid-filled vibration damping device according to claim 1, wherein a thick wall part is provided on the intermediate part of the elastic deformation area, and the at least one mass part is constituted by the thick wall part.

3. The fluid-filled vibration damping device according to claim 1, wherein the at least one mass part is integrally formed with the elastic deformation area.

4. The fluid-filled vibration damping device according to claim 1, wherein the at least one mass part is provided on an outer circumference end part of the closing rubber elastic plate.

5. The fluid-filled vibration damping device according to claim 1, wherein the at least one connecting hole comprises a plurality of connecting holes formed through the partition member, the at least one elastic deformation area comprises a plurality of elastic deformation areas formed on the circumference of the closing rubber elastic plate, the at least one mass part comprises a plurality of mass parts, the at least one mass-spring system comprises a plurality of mass-spring systems, and the plurality of mass-spring systems are constituted by providing the mass parts on the intermediate parts of the plurality of elastic deformation areas, respectively.

6. The fluid-filled vibration damping device according to claim 1,
wherein the closing rubber elastic plate includes: a center attachment part integrally formed at its center part, the center attachment part being attached in a fixed state to the partition member; and spoke shaped retaining parts extending in radial form toward an outer circumference side from the center attachment part, and
wherein the abutting retaining parts are provided so as to extend in the circumference direction from tip end parts of the spoke shaped retaining parts.

7. The fluid-filled vibration damping device according to claim 1, wherein the tuning frequency of the orifice passage is set to 5 to 15 Hz.

* * * * *